United States Patent
Kwon et al.

(10) Patent No.: US 12,199,288 B2
(45) Date of Patent: Jan. 14, 2025

(54) ANODE INCLUDING MULTIPLE CURRENT COLLECTORS JUXTAPOSED IN PARALLEL, AND SECONDARY BATTERY COMPRISING SAME

(71) Applicant: LG ENERGY SOLUTION, LTD., Seoul (KR)

(72) Inventors: Yo Han Kwon, Daejeon (KR); Il Hong Kim, Daejeon (KR); Min Chul Jang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 669 days.

(21) Appl. No.: 17/430,804

(22) PCT Filed: Nov. 4, 2020

(86) PCT No.: PCT/KR2020/015264
§ 371 (c)(1),
(2) Date: Aug. 13, 2021

(87) PCT Pub. No.: WO2021/096148
PCT Pub. Date: May 20, 2021

(65) Prior Publication Data
US 2022/0166030 A1  May 26, 2022

(30) Foreign Application Priority Data
Nov. 11, 2019 (KR) .................. 10-2019-0143778

(51) Int. Cl.
*H01M 4/133* (2010.01)
*H01M 4/134* (2010.01)
(Continued)

(52) U.S. Cl.
CPC .......... *H01M 4/742* (2013.01); *H01M 4/133* (2013.01); *H01M 4/134* (2013.01); *H01M 4/386* (2013.01);
(Continued)

(58) Field of Classification Search
CPC .................... H01M 50/531; H01M 10/647
See application file for complete search history.

(56) References Cited

U.S. PATENT DOCUMENTS

| 2003/0129494 A1 | 7/2003 | Kaneda et al. |
| 2004/0058238 A1* | 3/2004 | Miller .............. H01M 4/54 |
| | | 429/231.5 |

(Continued)

FOREIGN PATENT DOCUMENTS

| CN | 104321912 | 1/2015 |
| CN | 107078279 | 8/2017 |

(Continued)

OTHER PUBLICATIONS

PE2E translation of JP 2004265718 A (Year: 2004).*
(Continued)

*Primary Examiner* — Maria Laios
*Assistant Examiner* — Zackary Richard Cochenour
(74) *Attorney, Agent, or Firm* — Bryan Cave Leighton Paisner LLP (57) ABSTRACT

The present invention relates to an anode including multiple current collectors juxtaposed in parallel, and a secondary battery comprising same, wherein the anode enables providing a high-capacity secondary battery while suppressing volume changes due to a silicone component-containing active material employed therein.

20 Claims, 5 Drawing Sheets

(51) Int. Cl.
  *H01M 4/38*  (2006.01)
  *H01M 4/48*  (2010.01)
  *H01M 4/587*  (2010.01)
  *H01M 4/66*  (2006.01)
  *H01M 4/74*  (2006.01)
  *H01M 10/0525*  (2010.01)
  *H01M 10/0585*  (2010.01)
  *H01M 50/531*  (2021.01)
  *H01M 4/02*  (2006.01)

(52) U.S. Cl.
  CPC .......... *H01M 4/483* (2013.01); *H01M 4/587* (2013.01); *H01M 4/661* (2013.01); *H01M 10/0525* (2013.01); *H01M 10/0585* (2013.01); *H01M 50/531* (2021.01); *H01M 2004/027* (2013.01); *H01M 2220/20* (2013.01)

(56) References Cited

U.S. PATENT DOCUMENTS

| | | | |
|---|---|---|---|
| 2017/0294688 | A1 | 10/2017 | Jang et al. |
| 2017/0338470 | A1* | 11/2017 | Inoue ............... H01M 4/62 |

FOREIGN PATENT DOCUMENTS

| | | |
|---|---|---|
| EP | 3093915 A1 | 11/2016 |
| JP | 2004265718 | 9/2004 |
| JP | 2005-197217 A | 7/2005 |
| JP | 2009070782 A | 4/2009 |
| JP | 2010135111 | 6/2010 |
| JP | 2010-165471 A | 7/2010 |
| JP | 2019-061941 A | 4/2019 |
| KR | 10-0812749 B1 | 3/2008 |
| KR | 20080020892 | 3/2008 |
| KR | 10-1028657 B1 | 4/2011 |
| KR | 10-1061705 B1 | 9/2011 |
| KR | 10-2015-0118304 A | 10/2015 |
| KR | 20150128279 | 11/2015 |
| KR | 10-2016-0037784 A | 4/2016 |
| KR | 20190019759 | 2/2019 |
| KR | 10-2019-0105293 A | 9/2019 |

OTHER PUBLICATIONS

Office Action dated Aug. 22, 2022 issued in corresponding Japanese Patent Application No. 2021-547748.

International Search Report (with partial translation) and Written Opinion dated Mar. 24, 2021 issued in corresponding International Patent Application No. PCT/KR2020/015264.

Extended European Search Report issued from the European Patent Office dated Mar. 21, 2022 in connection with the corresponding European Patent Application No. 20887999.9.

* cited by examiner

ANODE INCLUDING MULTIPLE CURRENT COLLECTORS JUXTAPOSED IN PARALLEL, AND SECONDARY BATTERY COMPRISING SAME

TECHNICAL FIELD

The present invention relates to a negative electrode including a plurality of current collectors arranged in parallel to each other, and a secondary battery including the same.

This application claims the benefit of priority based on Korean Patent Application No. 10-2019-0143778, filed on Nov. 11, 2019, and the entire contents of the Korean patent application are incorporated herein by reference.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

This secondary battery is being developed as a model capable of realizing high voltage and high capacity at the request of consumers. In order to realize high capacity, an optimization process of a positive electrode material, a negative electrode material, a separator, and an electrolyte solution, which are the four major elements of a secondary battery, is required within a limited space.

In general, the easiest way to realize a high capacity is to put a large amount of electrode active materials on a current collector to thereby manufacture a high loading electrode. However, in such a method, if a certain level of electrode adhesive force or conductivity is not secured, electrode detachment occurs during electrode coating, drying, and rolling processes, resulting in lower lifespan characteristics and lower output characteristics, resulting in lower battery performance and stability.

Accordingly, there is a high need for developing an electrode capable of improving overall battery performance by preventing deterioration in output characteristics while having a high theoretical capacity and sufficient electrode adhesive force with a small amount of binders and conductive materials.

DISCLOSURE

Technical Problem

The present invention was invented in consideration of the above problems, and an object of the present invention is to provide a negative electrode having a new structure including a plurality of current collectors arranged in parallel with each other, and a high capacity secondary battery including the same.

Technical Solution

A negative electrode for a secondary battery according to the present invention includes first to n-th current collectors disposed in parallel to each other (n is an integer from 2 to 5); and a mixture layer formed on one or both surfaces of each current collector. Specifically, the mixture layer formed on at least one of the current collectors includes an active material containing a silicon component, and the mixture layer formed on another one or more of the current collectors includes an active material containing a carbon component. Further, one or more ends of the first to n-th current collectors are fastened to be electrically connected.

In one example, the active material containing a silicon component contains one or more selected from the group consisting of silicon (Si), silicon oxide ($SiO_x$, $0<x\leq2$) and a silicon-metal (M) alloy, and wherein the metal (M) contains at least one of Sn, Li, Zn, Mg, Cd, Ce, Ni, Fe, Cr, and Ti.

In another example, the j-th current collector (j is an integer from 1 to n) is in the form of a metal plate in which a plurality of thickness direction through holes are formed.

In one example, a k-th negative electrode including a k-th current collector (k is an integer from 1 to n−1) and a k-th mixture layer formed on one or both surfaces of the k-th current collector; and a (k+1)-th negative electrode including a (k+1)-th current collector and a (k+1)-th mixture layer formed on one or both surfaces of the (k+1)-th current collector have a structure which does not contact each other in a coated part region where the mixture layer is formed on the current collector.

In one specific example, in mixture layer including an active material containing a silicon component, a content of the active material containing the silicon component is in a range of 50 to 100% by weight, based on 100% by weight of the mixture layer including the active material containing the silicon component, and it is also possible to manufacture the mixture layer as a thin film layer consisting only of silicon.

In another specific example, in mixture layer including an active material containing a carbon component, a content of the active material containing the carbon component is in a range of 90 to 98% by weight, based on 100% by weight of the mixture layer including the active material containing the carbon component.

In one example, the negative electrode for a secondary battery includes: first and second current collectors arranged in parallel to each other; a first mixture layer formed on one or both surfaces of the first current collector and including an active material containing a silicon component; and a second mixture layer formed on one or both surfaces of the second current collector and including an active material containing a carbon component.

In a specific example, the first current collector is in a form of a metal plate in which a plurality of thickness direction through holes are formed.

For example, the negative electrode for a secondary battery includes: first and second current collectors arranged in parallel to each other; a first mixture layer formed on one surface of the first current collector; and a second mixture layer formed on one surface of the second current collector. Herein, the first mixture layer is formed on a surface opposite to the surface of the first current collector facing the second current collector, and the second mixture layer is formed on a surface of the second current collector facing the first current collector.

In another example, the negative electrode for a secondary battery includes: first and second current collectors arranged in parallel to each other; a first mixture layer formed on one surface of the first current collector; and a second mixture layer formed on one surface of the second current collector.

Herein, the first and second mixture layers are formed on opposite surfaces of the first and second current collectors, respectively.

In further another example, the negative electrode for a secondary battery includes: first and second current collectors arranged in parallel to each other; a first mixture layer formed on both surfaces of the first current collector; and a second mixture layer formed on one surface of the second current collector. Herein, the second mixture layer is formed on a surface of the second current collector facing the first current collector.

In addition, the present invention provides a secondary battery including the negative electrode described above.

In one example, the secondary battery includes a positive electrode, a negative electrode, and a separator interposed between the positive electrode and the negative electrode. Here, the negative electrode is as described above.

For example, the secondary battery is a pouch-type lithium secondary battery.

Advantageous Effects

The negative electrode for a secondary battery according to the present invention can provide a high-capacity secondary battery while suppressing the volume change caused by the adoption of an active material containing a silicon component.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

A negative electrode for a secondary battery according to the present invention includes first to n-th current collectors disposed in parallel to each other (n is an integer from 2 to 5); and a mixture layer formed on one or both surfaces of each current collector. The mixture layer formed on at least one of the current collectors includes an active material containing a silicon component, and the mixture layer formed on another one or more of the current collectors includes an active material containing a carbon component. Further, one or more ends of the first to n-th current collectors are fastened to be electrically connected.

The negative electrode for a secondary battery according to the present invention has a structure including a plurality of current collectors disposed in parallel to each other and a mixture layer formed on the current collector. In addition, the mixture layer formed on the current collector includes different types of active materials. Specifically, the mixture layer formed on at least one of the current collectors includes an active material containing a silicon component, and the mixture layer formed on another one or more of the current collectors includes an active material containing a carbon component.

In response to the demand for higher capacity for secondary batteries, research is being conducted on a technology about using a silicon-based component as a negative electrode active material. However, when a silicon-based component and a carbon-based component are mixed and applied as a negative electrode active material, the silicon-based component causes a large volume change during the charging and discharging process. This volume change has a problem of accelerating the deterioration of the electrode or the deterioration of the battery life. In addition, when a silicon-based component is applied as an active material, there is a limitation in that a large amount of a binder or a conductive material should be mixed in order to improve the life of the silicon-based component. However, in the present invention, two or more current collectors arranged in parallel are employed, a mixture layer to which an active material containing a silicon-based component is applied is formed in any one current collector, and a mixture layer to which an active material containing a carbon-based component is applied is formed in another current collector. Through this, the capacity of the battery can be maximized by reducing the content of the binder or the conductive material in the mixture layer to which the active material containing the carbon-based component is applied.

In one example, the active material containing a silicon component contains one or more selected from the group consisting of silicon (Si), silicon oxide ($SiO_x$, $0<x\leq2$) and a silicon-metal (M) alloy, and wherein the metal (M) contains at least one of Sn, Li, Zn, Mg, Cd, Ce, Ni, Fe, Cr, and Ti. For example, the active material containing a silicon component is at least one of silicon (Si) and silicon oxide ($SiO_x$, $0<x\leq2$).

Further, as the active material containing a carbon component, all of low crystalline carbon and/or high crystalline carbon may be used. As the low crystalline carbon, at least one of soft carbon and hard carbon may be used. At least one of natural graphite, Kish graphite, pyrolytic carbon, mesophase pitch based carbon fiber, mesocarbon microbeads, mesophase pitches, and petroleum or coal tar pitch derived cokes may be used as high crystalline carbon. For example, the active material containing the carbon component is a commonly used graphite component.

Non-limiting examples of the current collector used for the negative electrode include copper, gold, nickel, or a foil manufactured by a copper alloy or a combination thereof. In addition, the current collector may be used by stacking substrates made of the above materials. In one embodiment, the j-th current collector (j is an integer from 1 to n) is in the form of a metal plate in which a plurality of thickness direction through holes are formed. By applying a current collector in the form of a metal plate with through holes in the thickness direction, a flow path, through which the electrolyte solution, particularly lithium ions, can move, is formed.

In further another example, in the negative electrode for a secondary battery according to the present invention, a k-th negative electrode including a k-th current collector (k is an integer from 1 to n+1) and a k-th mixture layer formed on one or both surfaces of the k-th current collector; and a (k+1)-th negative electrode including a (k+1)-th current collector and a (k+1)-th mixture layer formed on one or both surfaces of the (k+1)-th current collector have a structure which does not contact each other in a coated part region where the mixture layer is formed on the current collector. The current collectors applied to the negative electrode for a secondary battery according to the present invention are arranged in parallel to each other, one or more ends of the current collector are fastened to be electrically connected, and at the same time, the coated parts, to which the mixture layer is applied, are not in contact with each other. This prevents the occurrence of a short circuit inside the battery. If necessary, a separate separator may be partially or entirely formed between the current collectors. However, forming a separate separator between current collectors may complicate the structure of the electrode and reduce process efficiency during manufacturing. Therefore, by separating the current collectors by a predetermined distance, contact in the coated part described above can be blocked.

The present invention includes a structure in which a plurality of current collectors are arranged in parallel, and a mixture layer formed on each current collector may include different types of active material components.

According to one embodiment, in the mixture layer including the active material containing the silicon component, the content of the active material containing the silicon component is in the range of 50 to 100% by weight based on 100% by weight of the mixture layer containing the active material containing the silicon component. Specifically, the content of the active material containing the silicon component may be preferably in the range of 75 to 85% by weight.

According to another embodiment, in the mixture layer including the active material containing the carbon component, the content of the active material containing the carbon component is in the range of 90 to 98% by weight, based on 100% by weight of the mixture layer containing the active material containing the carbon component. Specifically, the content of the active material containing the carbon component is in the range of 93 to 98% by weight.

In addition to the active material, the negative electrode for secondary battery may include a conductive material and a binder commonly used in the art. In the present invention, in the mixture layer containing an active material containing a silicon component, the content of the active material is limited to 85% by weight or less. The active material containing the silicon component causes a rapid volume change during the charging and discharging process, which accelerates the degradation of the electrode or the life of the battery. In order to prevent this, a relatively large amount of the binder and/or the conductive material component should be mixed to apply the active material containing the silicon component to the mixture layer.

In contrast, in the mixture layer including the active material containing a carbon component, the content of the active material can be increased to 90% by weight or more. The active material containing a carbon component can be mixed with a relatively small amount of a binder and/or a conductive material component. When the content of the binder and the conductive material component is increased, the content of the active material is relatively decreased, which causes a decrease in the capacity of the battery.

In one example, the negative electrode for a secondary battery includes: first and second current collectors arranged in parallel to each other; a first mixture layer formed on one or both surfaces of the first current collector and including an active material containing a silicon component; and a second mixture layer formed on one or both surfaces of the second current collector and including an active material containing a carbon component. In this case, the first current collector may be in the form of a metal plate in which a plurality of thickness direction through holes are formed.

Figure 1:
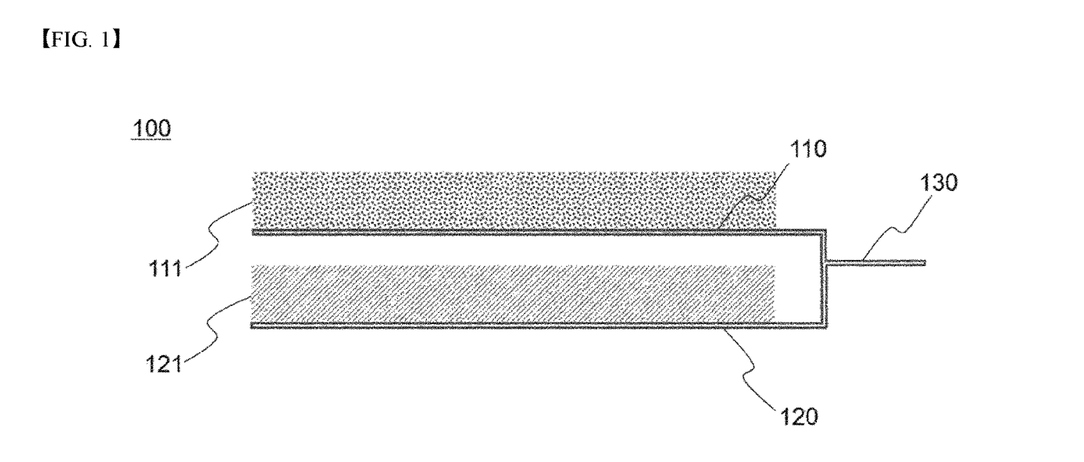
FIGS. 1 to 3 are cross-sectional views each showing the structure of a negative electrode for a secondary battery according to an embodiment.

The negative electrode for a secondary battery according to the present invention can be modified in various forms. For example, the negative electrode for a secondary battery includes: first and second current collectors arranged in parallel to each other; a first mixture layer formed on one surface of the first current collector; and a second mixture layer formed on one surface of the second current collector, wherein the first mixture layer is formed on a surface opposite to the surface of the first current collector facing the second current collector, and wherein the second mixture layer is formed on a surface of the second current collector facing the first current collector. In this case, the first and second mixture layers are formed on the surface in the same direction of the first and second current collectors, respectively, and may be formed, for example, as shown in FIG. 1.

Figure 2:
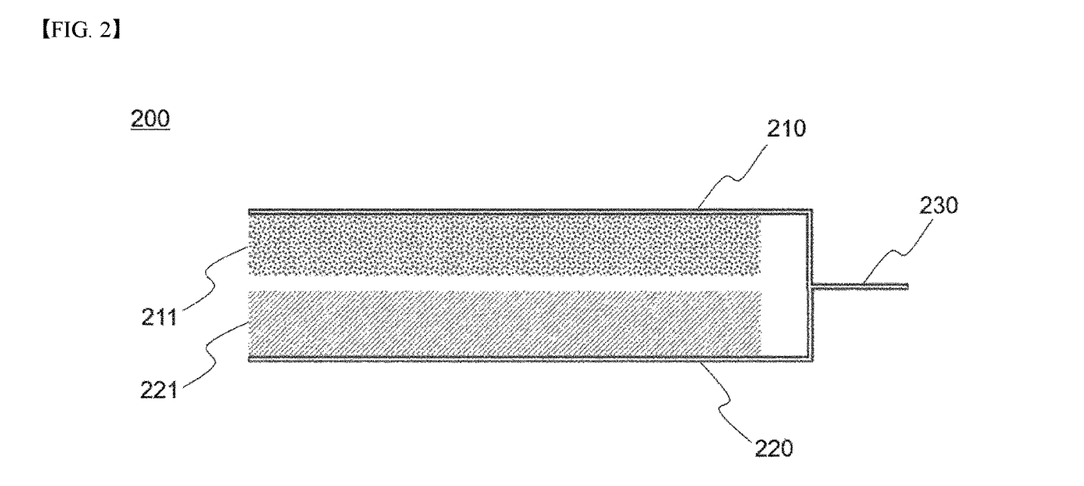

In further another example, the negative electrode for a secondary battery includes: first and second current collectors arranged in parallel to each other; a first mixture layer formed on one surface of the first current collector; and a second mixture layer formed on one surface of the second current collector, wherein the first and second mixture layers are formed on opposite surfaces of the first and second current collectors, respectively. In this case, the first and second mixture layers are formed to face each other, and may be formed, for example, as shown in FIG. 2.

In further another example, the negative electrode for a secondary battery includes: first and second current collectors arranged in parallel to each other; a first mixture layer formed on both surfaces of the first current collector; and a second mixture layer formed on one surface of the second current collector, wherein the second mixture layer is formed on a surface of the second current collector facing the first current collector. In this case, the first current collector has a structure in which a mixture layer is formed on both sides, and the second current collector has a structure in which a mixture layer is formed in the direction of the first current collector, and can be formed as, for example, the structure shown in FIG. 3.

In addition, the present invention provides a secondary battery including the negative electrode described above. Specifically, the secondary battery includes a positive electrode, a negative electrode, and a separator interposed between the positive electrode and the negative electrode. The structure of the negative electrode is as described above.

In one embodiment, the secondary battery is a pouch-type secondary battery. In addition, the secondary battery in the present invention is, for example, a pouch-type lithium secondary battery. The lithium secondary battery may include, for example, an electrode assembly; a non-aqueous electrolyte impregnating the electrode assembly; and a battery case containing the electrode assembly and the non-aqueous electrolyte.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2$ $(0.5<x<1.3, 0\leq y<1)$, $Li_xNi_{1-y}Mn_yO_2(0.5<x<1.3, 0\leq y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4$ $(0.5<x<1.3, 0<z<2)$, $Li_xCoPO_4(0.5<x<1.3)$ and $Li_xFePO_4$ $(0.5<x<1.3)$, and the lithium-containing transition metal oxide may be coated with a metal or metal oxide such as aluminum (Al). Further, in addition to the lithium-containing transition metal oxide, one or more of sulfide, selenide, and halide may be used.

The positive electrode active material may be included in the range of 94 to 98.5 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof.

The positive electrode active material layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, one or more selected from the group consisting of graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

As the binder component, a binder polymer commonly used in the art may be used without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

The separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

Polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, etc. may be used individually or as a polymer by a mixture thereof, to thereby form the non-woven fabric, in addition to polyolefin-based nonwoven fabric. The structure of the nonwoven fabric may be a spunbond nonwoven fabric composed of long fibers or a melt blown nonwoven fabric.

The thickness of the porous substrate is not particularly limited, but may be 5 to 50 μm, and the pore size and porosity present in the porous substrate are also not particularly limited, but may be 0.01 to 50 μm and 10 to 95%, respectively.

Meanwhile, in order to improve mechanical strength of the separator composed of the porous substrate and to suppress a short circuit between the positive electrode and the negative electrode, a porous coating layer including inorganic particles and a binder polymer may be further included on at least one surface of the porous substrate.

The electrolyte solution may contain an organic solvent and an electrolyte salt, and the electrolyte salt is a lithium salt. Those conventionally used in the electrolyte solution for lithium secondary batteries may be used as the lithium salt without limitation. For example, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $CF_3(CF_2)_7SO_3^-$, $CF_3CO_2^-$, $CH_3CO_2^-$, $SCN^-$ and $(CF_3CF_2SO_2)_2N^-$ may be included as the anion of the lithium salt.

As the organic solvent included in the electrolyte solution described above, those conventionally used in electrolyte solutions for lithium secondary batteries may be used without limitation, and for example, ethers, esters, amides, linear carbonates, and cyclic carbonates may be used alone or in combination of two or more. Among them, representatively, a cyclic carbonate, a linear carbonate, or a carbonate compound that is a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and a halide thereof, and a mixture thereof. These halides include, for example, fluoroethylene carbonate (FEC), but are not limited thereto.

In addition, specific examples of the linear carbonate compound include any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more of them may be typically used, but is not limited thereto.

In particular, among the carbonate-based organic solvents, ethylene carbonate and propylene carbonate, which are cyclic carbonates, are organic solvents of high viscosity and have high dielectric constants, so that lithium salts in the electrolyte can be more easily dissociated, and if the cyclic carbonate is mixed with a low viscosity, low dielectric constant linear carbonate such as dimethyl carbonate and diethyl carbonate in an appropriate ratio, an electrolyte solution having a higher electrical conductivity can be prepared.

In addition, as the ether of the organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

And esters among the organic solvents include any one selected from the group consisting of methyl acetate, ethyl acetate, propyl acetate, methyl propionate, ethyl propionate, propyl propionate, γ-butyrolactone, γ-valerolactone, and γ-caprolactone, or a mixture of two or more of them, but the present invention is not limited thereto.

The injection of the non-aqueous electrolyte may be performed at an appropriate step in the manufacturing process of the electrochemical device, depending on the manufacturing process and required physical properties of the final product. That is, it can be applied before assembling the electrochemical device or at the final stage of assembling the electrochemical device.

In addition, the present invention provides a vehicle including the secondary battery described above. In a specific example, the vehicle is a hybrid or electric vehicle.

Hereinafter, the present invention will be described in more detail through examples and drawings. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

Figure 3:
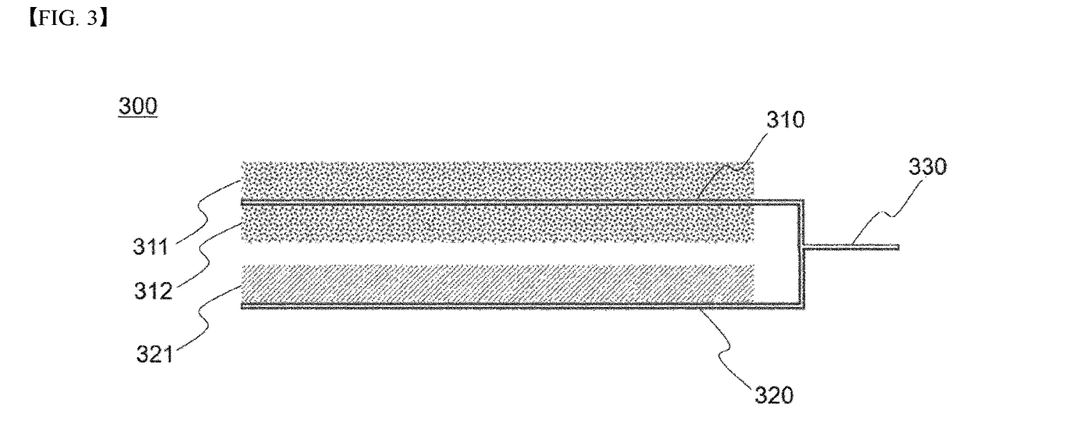

The negative electrode for a secondary battery according to the present invention can be modified in various forms. FIGS. 1 to 3 are cross-sectional views schematically showing a structure of a negative electrode for a secondary battery according to an embodiment, respectively.

First Embodiment

Figure 4:
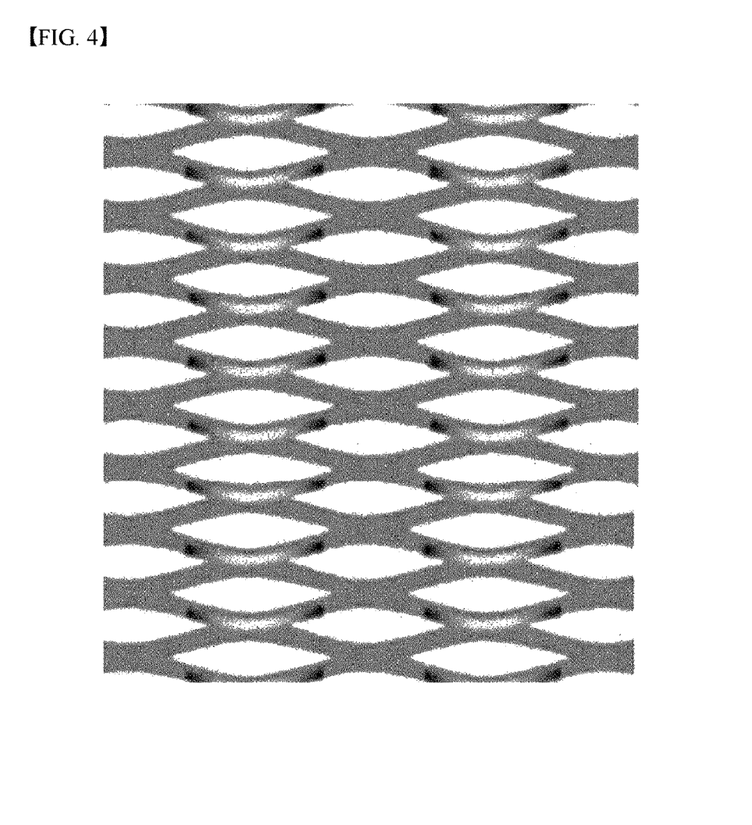
FIGS. 4 to 6 are cross-sectional views showing the structure of a copper current collector used for a negative electrode for a secondary battery according to an embodiment, respectively.

Referring to FIG. 1, a negative electrode 100 for a secondary battery according to the present invention includes: first and second current collectors 110 and 120 disposed in parallel to each other; a first mixture layer 111 formed on one surface of the first current collector 110; and a second mixture layer 121 formed on one surface of the second current collector 120. The first mixture layer 111 is formed on a surface opposite to a surface of the first current collector 110 facing the second current collector 120, and the second mixture layer 121 is formed on a surface of the second current collector 120 facing the first current collector 110. In this case, the first and second mixture layers 111 and 121 are formed on the surface in the same direction formed on the first and second current collectors 110 and 120, respectively. For example, an electrode assembly having a structure, in which a separator and a positive electrode are sequentially positioned in a direction in which the first mixture layer 111 of the first current collector 110 is formed, is formed. In addition, one end of the first and second current collectors 110 and 120 has a structure in which a current collector bonding unit 130 coupled to be electrically connected is formed. In order to manufacture the first mixture layer 111, 80 parts by weight of Si and/or SiO as active material components, 0.21 parts by weight of SWCNT and 9.79 parts by weight of SuperC as conductive material, and 10 parts by weight of PAA-PVA((Polyacrylic acid)-(polyvinyl alcohol)) as a binder component were added to water as a solvent to thereby prepare an active material slurry, which was then coated, dried and pressed once on the first current collector 110. As the first current collector 110, a copper current collector having a structure in which a plurality of through holes are formed in the thickness direction shown in FIG. 4 was used.

In addition, in order to manufacture the second mixture layer 121, 96 parts by weight of graphite as an active material, 1 part by weight of SuperC as a conductive material, 1.5 parts by weight of CMC (carboxymethylcellulose) and 1.5 parts by weight of SBR (Stylen-Buthylene-Rubber) as a binder or thickener component were added to water as a solvent to prepare an active material slurry, which was then coated, dried and pressed once on the second current collector 120. The second current collector 120 was made of copper foil.

Second Embodiment

Referring to FIG. 2, a negative electrode 200 for a secondary battery according to the present invention includes: first and second current collectors 210 and 220 disposed in parallel to each other; a first mixture layer 211 formed on one surface of the first current collector 210; and a second mixture layer 221 formed on one surface of the second current collector 220. The first and second mixture layers 211 and 221 are formed on surfaces of the first and second current collectors 210 and 220 facing each other, respectively. In this case, the first and second mixture layers 211 and 221 are formed to face each other. For example, an electrode assembly having a structure in which a separator and a positive electrode are sequentially positioned in a direction opposite to a surface, on which the first material mixture layer 211 is formed, is formed based on the first current collector 210. In addition, one end of the first and second current collectors 210 and 220 has a structure in which a current collector bonding unit 230 coupled to be electrically connected is formed.

Figure 5:
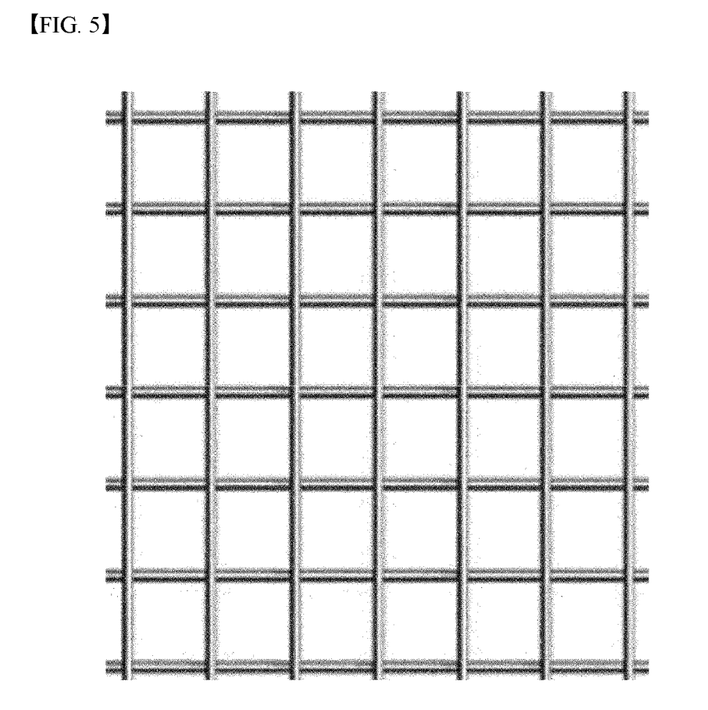

The composition of the first and second mixture layers 211 and 221 is the same as in the first embodiment described above. A mesh-type copper current collector illustrated in FIG. 5 was used as the first current collector 210, and the second current collector 220 was made of copper foil.

Third Embodiment

Referring to FIG. 3, a negative electrode 300 for a secondary battery according to the present invention includes: first and second current collectors 310 and 320 disposed in parallel to each other; first mixture layers 311 and 312 formed on one surface of the first current collector 310; and a second mixture layer 321 formed on one surface of the second current collector 320. The second mixture layer 321 has a structure formed on a surface of the second current collector 320 facing the first current collector 310. In this case, the first current collector 310 has a structure in which the mixture layers 311 and 312 are formed on both sides, and the second current collector 320 has a structure in which a mixture layer 321 is formed in the direction of the first current collector 310. In addition, one end of the first and second current collectors 310 and 320 has a structure in which a current collector bonding unit 330 coupled to be electrically connected is formed.

Figure 6:
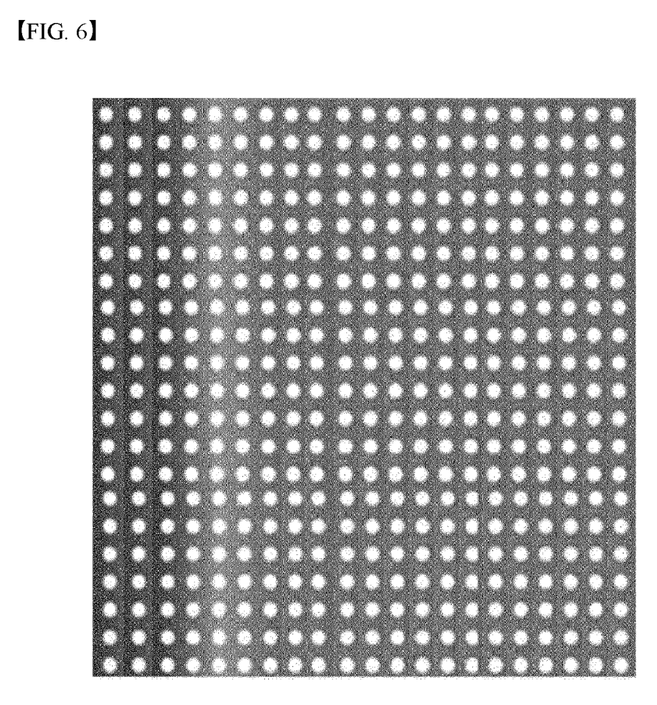

The composition of the first and second mixture layers 311, 312, and 321 is the same as in the first embodiment described above. A copper current collector having a plurality of through holes in the thickness direction shown in FIG. 6 was used as the first current collector 310, and the second current collector 320 was made of copper foil.

Fourth Embodiment

Figure 7:
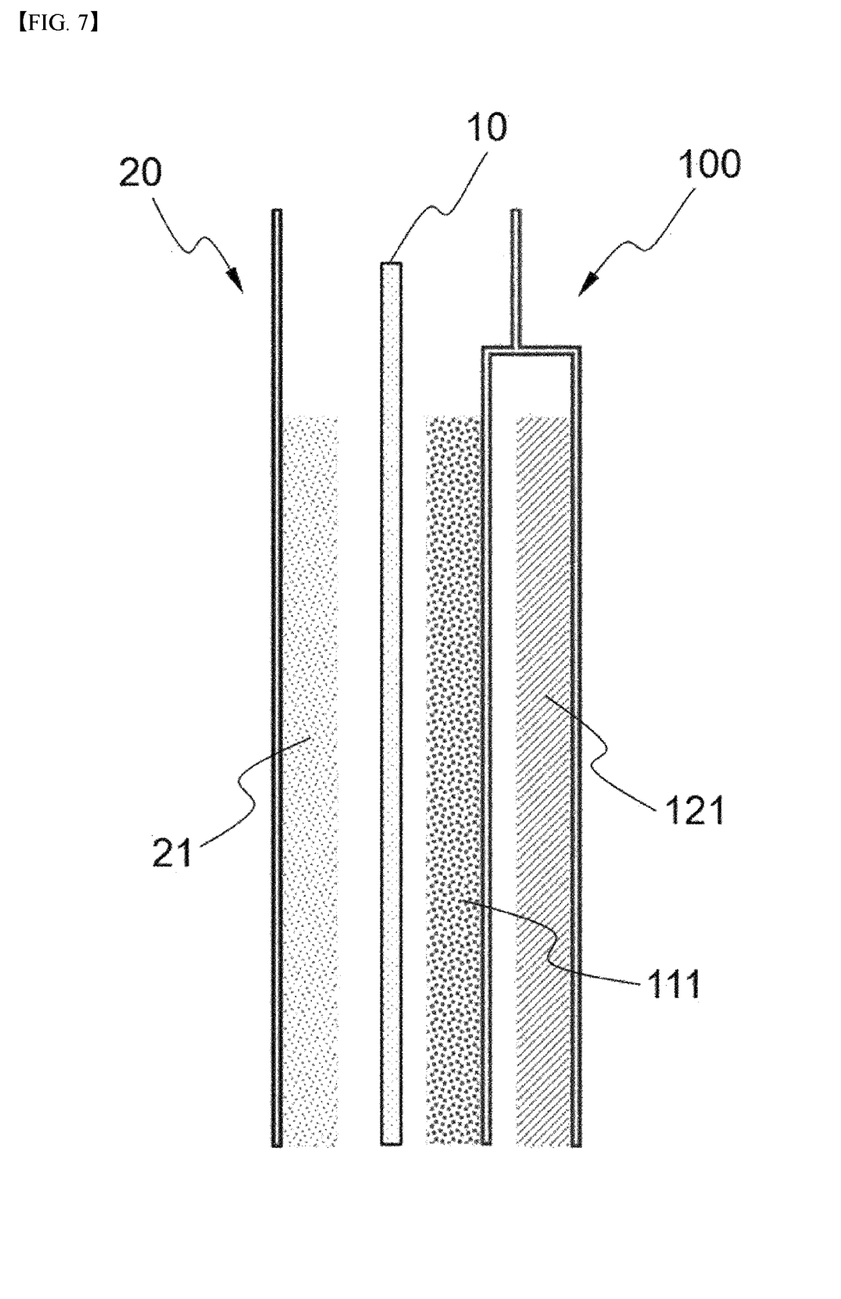
FIG. 7 is a cross-sectional view schematically showing the structure of a secondary battery using a negative electrode according to an embodiment.

FIG. 7 is a cross-sectional view schematically showing the structure of a secondary battery using a negative electrode according to the present invention. Referring to FIG. 7, a secondary battery according to an embodiment of the present invention includes a positive electrode 20, a negative electrode 100, and a separator 10 interposed between the positive electrode 20 and the negative electrode 100. The structure of the negative electrode 100 is the same as in the first embodiment described above.

DESCRIPTION OF REFERENCE NUMERALS

10: separator
20: positive electrode
21: positive electrode mixture layer
100, 200, 300: negative electrode
110, 210, 310: first current collector
111, 211: first mixture layer

The invention claimed is:

1. A negative electrode for a secondary battery, the negative electrode comprising:
first to n-th current collectors disposed in parallel to each other wherein n is an integer from 2 to 5; and
a mixture layer formed on one or both surfaces of each of the first to n-th current collectors,
wherein the mixture layer formed on at least one of the first to n-th current collectors includes an active material containing a silicon component,
wherein the mixture layer formed on another one or more of the first to n-th current collectors includes an active material containing a carbon component,
wherein the active material for the mixture layer formed on the at least one of the first to n-th current collectors and the active material for the mixture layer formed on the another one or more of the first to n-th current collectors are different from each other, and
wherein one or more ends of the first to n-th current collectors are fastened to be electrically connected to each other.

2. The negative electrode of claim 1, wherein the active material comprising a silicon component contains one or more selected from the group consisting of silicon (Si), silicon oxide (SiOx, 0<x≤2) and a silicon-metal (M) alloy, and
wherein the metal (M) contains at least one of Sn, Li, Zn, Mg, Cd, Ce, Ni, Fe, Cr, and Ti.

3. The negative electrode of claim 1, wherein a j-th current collector is in a form of a metal plate in which a plurality of thickness direction through holes are formed, and
wherein j is an integer from 1 to n.

4. The negative electrode of claim 1, wherein a k-th current collector and a k-th mixture layer formed on one or both surfaces of the k-th current collector form a k-th negative electrode, and a (k+1)-th current collector and a (k+1)-th mixture layer formed on one or both surfaces of the (k+1)-th current collector form a (k+1)-th negative electrode,
wherein the k-th negative electrode and the (k+1)-th negative electrode do not contact each other in a coated part region where the k-th and (k+1)-th mixture layers are formed respectively on the k-th and (k+1)-th current collectors, and
wherein k is an integer between from 1 to n+1.

5. The negative electrode of claim 1, wherein in the mixture layer comprising the active material containing the silicon component, a content of the active material containing the silicon component is in a range of 50 to 100% by weight, based on 100% by weight of the mixture layer including the active material containing the silicon component.

6. The negative electrode of claim 1, wherein in the mixture layer including the active material containing the carbon component, a content of the active material containing the carbon component is in a range of 90 to 98% by weight, based on 100% by weight of the mixture layer including the active material containing the carbon component.

7. The negative electrode of claim 1, wherein:
the first and second current collectors are arranged in parallel to each other;
a first mixture layer formed on one or both surfaces of the first current collector includes the active material containing a silicon component; and
a second mixture layer formed on one or both surfaces of the second current collector includes the active material containing a carbon component.

8. The negative electrode of claim 7, wherein the first current collector is in a form of a metal plate in which a plurality of thickness direction through holes are formed.

9. The negative electrode of claim 1, wherein:
the first and second current collectors are arranged in parallel to each other;
a first mixture layer formed on the first current collector is formed on a surface of the first current collector facing away from the second current collector; and
a second mixture layer formed on the second current collector is formed on a surface of the second current collector facing the first current collector.

10. The negative electrode of claim 1, wherein:
the first and second current collectors are arranged in parallel to each other;
a first mixture layer formed on the first current collector is formed on a surface of the first current collector facing the second current collector; and
a second mixture layer formed on the second current collector is formed on a surface of the second current collector facing the first current collector.

11. The negative electrode of claim 1, wherein:
the first and second current collectors are arranged in parallel to each other;
a first mixture layer formed on the first current collector is formed on both surfaces of the first current collector; and
a second mixture layer formed on the second current collector is formed on a surface of the second current collector facing the first current collector.

12. A secondary battery comprising a positive electrode, a negative electrode, and a separator interposed between the positive electrode and the negative electrode,
wherein the negative electrode comprises:
first to n-th current collectors disposed in parallel to each other wherein n is an integer from 2 to 5; and
a mixture layer formed on one or both surfaces of each of the first to n-th current collectors, wherein the mixture layer formed on at least one of the first to n-th current collectors includes an active material containing a silicon component, wherein the mixture layer formed on another one or more of the first to n-th current collectors includes an active material containing a carbon component, wherein the active material for the mixture layer formed on the at least one of the first to n-th current collectors and the active material for the mixture layer formed on the another one or more of the first to n-th current collectors are different from each other, and wherein one or more ends of the first to n-th current collectors are fastened to be electrically connected to each other.

13. The secondary battery of claim 12, wherein the secondary battery is a pouch-type lithium secondary battery.

14. The secondary battery of claim 12, wherein the active material comprising a silicon component contains one or more selected from the group consisting of silicon (Si), silicon oxide (SiOx, $0<x\leq2$) and a silicon-metal (M) alloy, and wherein the metal (M) contains at least one of Sn, Li, Zn, Mg, Cd, Ce, Ni, Fe, Cr, and Ti.

15. The secondary battery of claim 12, wherein a j-th current collector is in a form of a metal plate in which a plurality of thickness direction through holes are formed, and wherein j is an integer from 1 to n.

16. The secondary battery of claim 12, wherein in the mixture layer comprising the active material containing the silicon component, a content of the active material containing the silicon component is in a range of 50 to 100% by weight, based on 100% by weight of the mixture layer including the active material containing the silicon component.

17. The secondary battery of claim 12, wherein in the mixture layer including the active material containing the carbon component, a content of the active material containing the carbon component is in a range of 90 to 98% by weight, based on 100% by weight of the mixture layer including the active material containing the carbon component.

18. The secondary battery of claim 12, wherein:
the first and second current collectors are arranged in parallel to each other;
a first mixture layer formed on the first current collector is formed on a surface of the first current collector facing away from the second current collector; and
a second mixture layer formed on the second current collector is formed on a surface of the second current collector facing the first current collector.

19. The secondary battery of claim 12, wherein:
the first and second current collectors are arranged in parallel to each other;
a first mixture layer formed on the first current collector is formed on a surface of the first current collector facing the second current collector; and
a second mixture layer formed on the second current collector is formed on a surface of the second current collector facing the first current collector.

20. The secondary battery of claim 12, wherein:
the first and second current collectors are arranged in parallel to each other;
a first mixture layer formed on the first current collector is formed on both surfaces of the first current collector; and
a second mixture layer formed on the second current collector is formed on a surface of the second current collector facing the first current collector.

* * * * *